United States Patent [19]
Steibel et al.

[11] Patent Number: 6,024,898
[45] Date of Patent: Feb. 15, 2000

[54] ARTICLE AND METHOD FOR MAKING COMPLEX SHAPED PREFORM AND SILICON CARBIDE COMPOSITE BY MELT INFILTRATION

[75] Inventors: James D. Steibel, Hamilton, Ohio; Gregory S. Corman, Ballston Lake, N.Y.; Robert C. Schikner, San Diego, Calif.; Andrew Szweda, Midland, Mich.

[73] Assignee: General Electric Company, Schenectady, N.Y.

[21] Appl. No.: 08/777,129

[22] Filed: Dec. 30, 1996

[51] Int. Cl.⁷ .................... C01B 31/26; C01B 31/24; B28B 1/14; B28B 5/24
[52] U.S. Cl. ............... 264/29.1; 264/29.5; 264/29.6; 264/29.7; 264/624; 264/625; 264/626
[58] Field of Search .................. 264/29.1, 29.5, 264/29.6, 29.7, 624, 625, 626

[56] References Cited

U.S. PATENT DOCUMENTS

| | | | |
|---|---|---|---|
| 2,938,807 | 5/1960 | Andersen | 106/44 |
| 3,275,722 | 9/1966 | Popper | 264/65 |
| 3,495,939 | 2/1970 | Forrest | 23/208 |
| 4,019,913 | 4/1977 | Weaver et al. | 106/44 |
| 4,120,731 | 10/1978 | Hillig et al. | 106/44 |
| 4,148,894 | 4/1979 | Hillig et al. | 428/242 |
| 4,432,957 | 2/1984 | Gupta et al. | 423/345 |
| 4,536,449 | 8/1985 | Kennedy et al. | 428/408 |
| 4,737,476 | 4/1988 | Hillig | 501/87 |
| 4,810,442 | 3/1989 | Hillig et al. | 264/60 |
| 4,957,811 | 9/1990 | Benker et al. | 428/312.6 |
| 5,015,540 | 5/1991 | Borom et al. | 428/698 |
| 5,021,367 | 6/1991 | Singh et al. | 501/88 |
| 5,330,854 | 7/1994 | Singh et al. | 428/698 |
| 5,336,350 | 8/1994 | Singh | 156/155 |
| 5,512,351 | 4/1996 | Miyamichi et al. | 428/195 |

*Primary Examiner*—Deborah C. Lambkin
*Assistant Examiner*—Dominic Keating
*Attorney, Agent, or Firm*—Noreen C. Johnson; Douglas E. Stoner

[57] ABSTRACT

Small diameter silicon carbide-containing fibers are provided in a bundle such as a fiber tow that can be formed into a structure where the radii of curvature is not limited to 10–20 inches. An aspect of this invention is directed to impregnating the bundles of fibers with the slurry composition to substantially coat the outside surface of an individual fiber within the bundle and to form a complex shaped preform with a mass of continuous fibers.

19 Claims, 1 Drawing Sheet

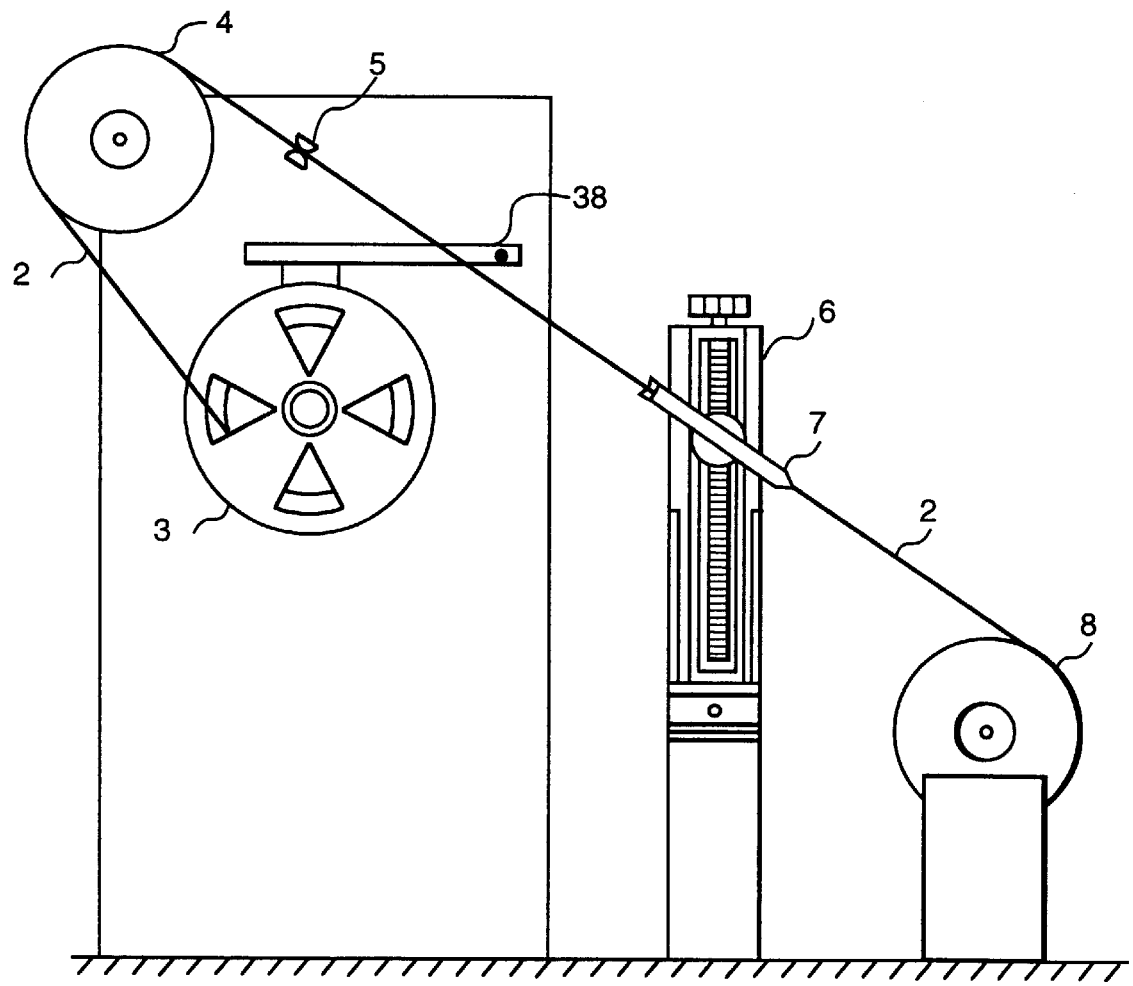

ARTICLE AND METHOD FOR MAKING COMPLEX SHAPED PREFORM AND SILICON CARBIDE COMPOSITE BY MELT INFILTRATION

This invention was made with government support under Contract No NAS3-26385 awarded by the National Aeronautical and Space Administration (NASA). The government may have certain rights to the invention.

FIELD OF THE INVENTION

Generally, this invention relates to novel processing techniques and slurry modifications incorporating small diameter fibers in complex preform shapes. The invention further relates to making silicon carbide composites using melt infiltration processing. In particular, this invention relates to using bundles of continuous silicon carbide-containing fibers having diameters in the range of about 5 to 40 micrometers, that are impregnated with a high char yielding resin slurry containing fine carbon and silicon carbide particles.

BACKGROUND OF THE INVENTION

Fiber reinforcement of a ceramic composite offers significant opportunities for toughening the brittle matrix of the composite. There is an interest in fiber reinforced composites for use in high temperature applications, such as combustors and engines. Structures with carbon fiber reinforced carbon matrices have been tried but they have the disadvantage of poor oxidation resistance at high temperatures, such as 1200° C. or above. High strength carbon fibers have also been tape cast in a slurry and formed into a preform and then infiltrated with molten silicon with the hope that the silicon matrix would protect the carbon filaments in high temperature, oxidative environments. However, in this process the carbon filaments tend to convert into relatively weak, irregular columns of silicon carbide crystals resulting in composites with low toughness and relatively modest strength.

To alleviate the problems with carbon fibers in a carbon matrix, large diameter (about 140 micrometers or greater) silicon carbide-containing fibers provided with a coating of boron nitride have been tried with molten silicon infiltration to form a silicon-silicon carbide composite. The silicon melt approach in combination with the silicon carbide material has proven to be effective in preventing damage to the fiber. The spacing of the fibers in the preform due to the large diameter size allows the molten silicon to react with the carbonaceous material in the preform to provide a silicon-silicon carbide matrix. However, the size of the fibers prevents the formation of complex shapes due to limited bend radii. When smaller discontinuous fibers are used (about 0.3 to 50 micrometers in diameter), a silicon-wetting coating is required over the boron nitride coating. Even then, if the small diameter fibers are bundled, they often do not wet with molten silicon and as a result, pockets of elemental silicon form in the silicon carbide matrix. This results in a weaker silicon carbide composite.

U.S. Pat. Nos. 5,015,540; 5,330,854; and 5,336,350; incorporated herein by reference, relate to the production of silicon carbide matrix composites containing fibrous material that is infiltrated with molten silicon, herein referred to as the Silcomp process. The fibers generally have diameters of about 140 micrometers or greater, which prevents intricate, complex shapes to be manufactured during formation of the preform. Limited bend radii of these fibers restrict their use to structures with radii of curvature between 1–2 inches in diameter. At smaller radii of curvature, the large diameter fibers will fracture at elevated temperatures of about 2000° F. or greater due to the high residual stresses imposed in the fiber. Thus, there is a need for a method to make complex shaped preforms that incorporate continuous bundles of smaller diameter fibers in the preform that will subsequently provide tougher, stronger high temperature composites.

Presently, in the manufacture of silicon-silicon carbide composites, the fibers in the preform are coated with a low char yield slurry composition containing polymers that decompose upon heating. The polymers produce little or no char after decomposition, which means that there is little or no solid material after burnout. As a result, a low char yield slurry composition used to coat the fiber provides a low strength preform after burn-out processing. This is not desirable if the preform has to be moved or transported from one furnace to another. A need is created for an improved preform with high strength after burn-out.

The Silcomp process for making silicon-silicon carbide composite, uses coarse carbon and silicon carbide powders as filler materials in the slurry composition that is coated on the fibers or in the preform itself. The coarse powders do not completely react during the molten silicon infiltration to convert all of the available carbon to silicon carbide, thus yielding a high residual carbon content in the matrix (about 10–20 volume percent silicon). This creates a need for a lower elemental carbon in the silicon-silicon carbide composite.

Although operable, the above-mentioned Silcomp process provides an opportunity for process and product improvement. There is a need for complex shaped preforms that accommodate small diameter silicon carbide-containing fibers that are bundled and gathered in tows. There is also a need for a novel slurry composition to coat the small diameter fibers with high char yield resins to provide a stronger and tougher preform after burnout and containing fine particles of carbon and silicon carbide that can penetrate between the fibers that are bundled in tows. There is also a need for a method of making complex shaped preforms and composites by molten silicon infiltration that provides an improved silicon-silicon carbide composite.

SUMMARY OF THE INVENTION

The present invention provides process, preform, and composite improvements that meet the above needs. In accordance with one aspect of the invention, there is provided a method for preparing a complex-shaped preform comprising: providing a mass of continuous fibers, each fiber having a diameter less than about 40 micrometers; impregnating the mass of fibers with a slurry composition containing at least one high char yield resin selected from a carbon forming resin or a ceramic forming resin or a mixture of both; forming the impregnated mass of fibers into a preselected preform; and firing the preform at a temperature and time sufficient to cure the preform. Silicon carbide-containing fibers are contemplated as fibers. Generally, the mass of fibers are bundled in tows and continuous lengths. By the term "continuous lengths" is meant fiber lengths greater than or equal to 1 centimeter (>1 cm). The bundles of fibers are often formed into complex shapes to form the fiber preform which is subsequently infiltrated with molten silicon.

In accordance with a further aspect of the invention, a method is provided for preparing a silicon-silicon carbide composite comprising the steps of: providing a mass of silicon carbide-containing fibers bundled in tows, each fiber having a diameter less than about 40 micrometers; impregnating the mass of silicon carbide-containing fibers with a slurry composition containing at least one high char yield resin selected from the group consisting of a carbon forming resin, a ceramic forming resin, and mixtures thereof; forming the impregnated mass of fibers into a complex shape of a preselected preform; curing the complex shape to form a silicon carbide-containing fiber preform; providing a necessary amount of a carbonaceous material in the preform to react with molten silicon to form silicon carbide; and then infiltrating the preform with molten silicon. Substantially all of the carbonaceous material in the preform reacts with the molten silicon to form a substantially dense silicon-silicon carbide composite.

Yet another aspect of the invention is an improved silicon carbide-containing fiber preform comprising 1-dimensional, 2-dimensional, or 3-dimensional aligned tows of silicon carbide-containing fibers, each fiber having a diameter up to and including 40 micrometers and coated with a slurry composition comprising at least one high char yield resin, and particulate material comprising carbon particles, or silicon carbide particles, or mixtures thereof, said particles having a mean particle size of about 0.1 to 20 micrometers.

Still a further aspect of the invention is a silicon carbide matrix composite comprising a mass of silicon carbide-containing fibers, each fiber having a diameter up to and including 40 micrometers, said fibers occupy about 5 to about 45 volume percent of the composite; a substantially pore-free silicon-silicon carbide matrix in an amount of about 55 to about 95 volume percent of the composite.

Yet another aspect of the invention includes an article of manufacture for use in an engine, said article made of a ceramic composite having an elemental silicon phase, a silicon carbide phase, a mass of silicon carbide-containing fibrous material bundled in tows, each fiber having a diameter up to and including 40 micrometers, and said fibers occupy about 5 to about 45 volume percent of the composite.

An advantage of the invention is the formation of a robust, tough preform having small diameter silicon carbide-containing fibers. The preform is less likely to be damaged or fail if it is disturbed or moved prior to making the composite with molten silicon infiltration. Another advantage of the invention is that complex, intricate shapes can be formed into silicon carbide composite structures.

Other features and advantages of the invention will be apparent from the following more detailed description of the invention, taken in conjunction with the accompanying drawings, which illustrate the invention.

BRIEF DESCRIPTION OF THE DRAWINGS

FIG. 1 depicts a schematic drawing of a drum winding apparatus used to impregnate fiber tows with the high char yielding slurry composition.

DETAILED DESCRIPTION OF THE INVENTION

In this invention, small diameter silicon carbide-containing fibers are provided in a bundle such as a fiber tow that can be formed into a structure where the radii of curvature is not limited to 1–2 inches. "Small diameter" fiber means the diameter of the fiber is up to and including about 40 micrometers. Generally, the fiber diameter is between about 0.1 to 40 micrometers. Preferably, the fiber diameter is between about 0.2 to 25 micrometers. Most preferably, the fiber diameter is between about 5 to 25 micrometers. As a result, more complex shaped silicon carbide composite parts can be made and utilized for various systems, such as combustors.

The term "fibers bundled in tows" refers to continuous lengths of small diameter fibers that are bundled together in a compact fashion. The tightness of the bundle and the small diameter of the fiber poses a large fiber surface area to be coated with the slurry composition. The tows of fibers can be one dimensional (1-D) or woven into two-dimensional sheets or cloth (2-D), or three dimensional structures (3-D). Due to the small diameter size of the fibers, the challenge with the use of bundles of fine fibers is achieving complete penetration of the slurry composition containing carbon, silicon carbide, or mixtures of silicon carbide and carbon particles, into the interior mass of the fibers, that is, the interstices between the fibers within a tow. Each fiber in the bundle is substantially coated with the slurry composition. Thus, an aspect of this invention is directed to impregnating the bundles of fibers with the slurry composition to substantially coat the outside surface of an individual fiber within the bundle.

By "silicon carbide-containing fiber" is meant a fiber having a composition that contains silicon carbide, and preferably contains substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they contain silicon carbide.

For instance, other core materials which may be enveloped by silicon carbide include carbon and tungsten. The fibrous material can be amorphous, crystalline, or a mixture thereof. The crystalline material may be single crystal or polycrystalline. Examples of silicon carbide-containing fibrous materials are silicon carbide, Si-C-O, Si-C-O-N, Si-C-O-Metal, and Si-C-O-Metal where the Metal component can vary but frequently is titanium or zirconium. There are processes known in the art which use organic precursors to produce silicon carbide-containing fibers which may introduce a wide variety of elements into the fibers.

The silicon carbide-containing fiber may have at least one or more additional outer coatings on the fiber surface prior to impregnating the mass of fibers with the slurry composition. The coating on the fibers serves to improve protection of the fiber during molten silicon infiltration and provide fiber-matrix debonding during fracture. Preferably, the fiber has at least one coating on its outer surface. A preferred embodiment of the invention is having a fiber with a boron nitride coating. The boron nitride coating can be combined in any way with other coatings on the fiber. For instance, it is contemplated that a silicon carbide-containing fiber might have a boron nitride coating and a silicon carbide coating. Another example of a coating system for the silicon carbide-containing fiber may be boron nitride, carbide, and silicon nitride. Still another example of a coating system for the fibers may be boron nitride, silicon carbide, carbide, and silicon nitride. Other examples of coating systems are boron nitride, carbon, silicon nitride and carbon; or carbon, boron nitride, carbon, silicon nitride, and carbon. These examples are listed as some of the possibilities for various coating systems, and do not limit the fiber coatings only to these coating systems.

In carrying out the present process, a first coating is deposited on the fibrous material which leaves at least no significant portion of the fibrous material exposed, and preferably, the entire material is coated. The coating should be continuous, free of any significant porosity and preferably it is pore-free and significantly uniform. Examples of coatings on the fibrous material that are contemplated for this invention are nitrides, borides, carbides, oxides, silicides, or other similar ceramic refractory material. Representative of ceramic carbide coatings are carbides of boron, chromium, hafnium, niobium, silicon, tantalum, titanium, vanadium, zirconium, and mixtures thereof. Representative of the ceramic nitrides useful in the present process is the nitride of boron, hafnium, niobium, silicon, tantalum, titanium, vanadium, zirconium, and mixtures thereof. Examples of ceramic borides are the borides of hafnium, niobium, tantalum, titanium, vanadium, zirconium, and mixtures thereof. Examples of oxide coatings are oxides of aluminum, yttrium, titanium, zirconium, beryllium, silicon, and the rare earths. The thickness of the coating can be about 0.1 to about 4.0 micrometers thick. A preferred thickness is about 0.3–1.0 micrometers.

The fibrous material may have more than one coating. An additional coating should be wettable with silicon and be about 500 Angstroms to about 3 micrometers. Representative of useful silicon-wettable materials is elemental carbon, metal carbide, a metal coating which later reacts with molten silicon to form a silicide, a metal nitride such as silicon nitride, and a metal silicide. Elemental carbon is preferred and is usually deposited on the underlying coating in the form of pyrolytic carbon. Generally, the metal carbide is a carbide of silicon, tantalum, titanium, or tungsten. The metal nitride may be a nitride of boron, hafnium, niobium, silicon, tantalum, titanium, vanadium, zirconium, and mixtures thereof. Generally, the metal silicide is a silicide of chromium, molybdenum, tantalum, titanium, tungsten, and zirconium. The metal which later reacts with molten silicon to form a silicide must have a melting point higher than the melting point of silicon and preferably higher than about 1450° C. Usually, the metal and silicide thereof are solid in the present process. Representative of such metals is chromium, molybdenum, tantalum, titanium, and tungsten.

Known techniques can be used to deposit the coatings which generally are deposited by chemical vapor deposition using low pressure techniques.

The utilization of novel processing techniques to make complex shaped preforms allows the incorporation of smaller diameter silicon carbide-containing fibers in the form of multi-filament tows. The fabrication of the silicon carbide-containing fiber preform impregnates 1-D fiber tows and 2-D fabric with a high char yield slurry composition followed by compression molding, bladder molding, or autoclaving to form the tough preform. Resin transfer molding (RTM) is used for incorporation of the slurry into 2-D or 3-D woven preforms. The techniques of impregnation and lamination (also referred to as prepreg) and RTM result in near-net shape cured structures which can later be infiltrated with molten silicon to react with carbonaceous material in the preform and form a substantially fully dense silicon carbide composite. The final porosity of the composite is close to zero.

Slurry compositions containing high char yielding resins are useful for impregnating the fibers tows in one dimensional and two dimensional structures, or two and three dimensional structures using resin transfer molding. The addition of high char yielding resins to the slurry increases burn-out strength and produces a hard, tough preform. The term "high char yielding resin" means that after burnout, the resin decomposes and leaves behind solid material, such as carbon, silicon carbide, and silicon nitride. The high char yielding resin provides integrity to the preform structure during burn-out and subsequent silicon melt infiltration steps. The high char yield resin also improves the handle ability and machinability of the cured preform structure.

Examples of high char yielding resins that are suitable for use in the slurry composition are carbon forming resins and ceramic forming resins. Carbon forming resins can include phenolics, furfuryl alcohol, partially-polymerized resins derived therefrom, petroleum pitch, and coal tar pitch. Ceramic forming resins include those resins which pyrolyze to form a solid phase (crystalline or amorphous) containing one or more of the following: silicon carbide, carbon, silicon nitride, silicon-oxycarbides, silicon-carbonitrides, boron carbide, boron nitride, and metal carbides or nitrides where the metal is typically zirconium or titanium. Further examples are polycarbosilanes, polysilanes, polysilazanes, and polysiloxanes.

Small particle size carbon and small silicon carbide particles, as present in the slurry composition (either alone or as an admixture), allow penetration or impregnation into the tows of the small diameter fibers during prepreg or RTM. Small particle size carbon and silicon carbide is usually a particle having a mean size of about 0.1 to about 20.0 micrometers. A preferred range for the carbon and silicon carbide particle is about 0.2 to about 5.0 micrometers. The most preferred range is about 0.3 to about 3.0 micrometers. A small particle size for a silicon carbide particle is having a mean particle size of less than or equal to about one micrometer.

Appropriate solvents that can be used in the slurry composition include, but are not limited to: water-based solvents, water, organic-based solvents, toluene, xylene, methyl-ethyl ketone, methyl-isobutyl ketone (4-methyl-2-pentanone), acetone, ethanol, methanol, isopropanol, 1,1,1-trichloroethane, tetrahydrofuran, tetrahydro furfuryl alcohol, FSX-3 (a product distributed by Bargamo Corporation, Westport, Conn.), cellosolve, and butyl cellosolve.

The bundles of fibers are formed in a preselected preform to make complex shaped structures for the silicon-silicon carbide composite. The fibers are impregnated with the slurry composition either before the fibers are placed in the preform or after being placed in the preform. Once the fibers are in the preform, shaped to the desired structure, and impregnated with the slurry composition, then the next step is to fire or burn-out the preform containing the coated fibrous material. The burn-out yields the high char residue from the slurry composition. It is desirable to have a high char residue in the preform prior to molten silicon infiltration, so as to provide carbon for subsequent reaction with the molten silicon to form the silicon-silicon carbide composite.

Based on the amount of high char residue in the preform after curing and burn-out, additional carbon, silicon carbide, mixtures of carbon and silicon carbide, and/or additional compounds, may be added to the preform before the molten silicon infiltration step. Other elements or compounds may be added to the preform to give different composite properties or structure. The particular composition of the admixture is determinable empirically and depends largely on the particular composition desired, i.e., the particular properties desired in the composite.

The carbonaceous material in the preform may be added as elemental carbon including graphite particles, flakes, whiskers, or fibers of amorphous, single crystal, or polycrystalline carbon, carbonized plant fibers, lamp black, finely divided coal, charcoal, and carbonized polymer fibers or felt such as rayon, poly-acrylonitrile, and polyacetylene.

The carbon and any other compounds in the preform can be in the form of a powder and may have an average particle size of less than about 50 microns, more preferably less than about 10 microns.

After the preform is fired and cured, the admixture in the preform containing the mass of fibers, carbon, and other compounds if present, are infiltrated by molten silicon. In carrying out the present process, the preform is contacted with the silicon infiltrant. The infiltrating means allow the molten silicon infiltrant to be infiltrated into the preform. U.S. Pat. No. 4,737,328, incorporated herein by reference, discloses an infiltration technique. In the present process, sufficient molten silicon infiltrant is infiltrated into the preform to produce the present composite. Specifically, the molten silicon infiltrant is mobile and highly reactive with elemental carbon to form silicon carbide. Pockets of a silicon phase also form in the matrix. A silicon phase is defined as containing substantially elemental silicon, where other elements, such as boron, may be dissolved in the silicon phase.

The period of time required for infiltration is determinable empirically and depends largely on the size of the preform and extent of infiltration required. Generally, it is complete in less than about 30 minutes, and often in less than about 20 to 10 minutes, and even in less than about 10 minutes. The resulting infiltrated body is cooled in an atmosphere and at a rate which has no significant deleterious effect on it.

By practicing this invention and using small diameter fibers as well as high char yield resins in the slurry composition, a low residual carbon content in the composite matrix is obtained.

The present composite then is comprised of coated small diameter fibrous material and a matrix phase. The matrix phase is distributed through the coated fibrous material and generally it is substantially space filling and usually it is interconnecting. Generally, the coated fibrous material is totally enveloped by the matrix phase. The matrix phase contains a phase or phases formed in situ of silicon carbide and silicon. The fibrous material comprises at least about 5% by volume, or at least about 10% by volume of the composite. The matrix contains a silicon carbide phase in an amount of about 5% to 95% by volume, or about 10% to 80% by volume, or about 30% to 60% by volume, or about 45% to 55% by volume, of the composite. The matrix may contain an elemental silicon phase in an amount of about 5% to 50% by volume of the composite.

The following examples further serve to demonstrate, but not limit, the invention.

EXAMPLES

Example A

In this example a strong, tough ceramic composite consisting of Hi-Nicalon™ reinforcing fibers (available from Dow Corning, Midland, Mich.) in a melt infiltrated silicon-silicon carbide matrix was fabricated using a method of pre-impregnating coated fiber tows with a matrix precursor slurry to form unidirectional reinforced tapes, which were then laminated to give a 2-D reinforced preform for melt infiltration. The first step was to coat the reinforcement fibers with an appropriate fiber coating. In this example the specific fiber coating consisted of 0.02 $\mu$m of carbon followed by 0.5 $\mu$m of boron nitride followed by 0.02 $\mu$m of carbon followed by 0.5 $\mu$m of silicon nitride followed by 0.05 $\mu$m of carbon, all deposited by a low pressure chemical vapor deposition (CVD) process.

The slurry, from which the matrix of the composite preform is derived, was prepared by adding to a 250 ml polyethylene bottle: 300 g of zirconia grinding media, 35 g of silicon carbide powder (Type HSC Sic Grade 059(s) from Superior Graphite Co., Chicago, Ill.), 15 g carbon powder (Thermax Ultra Pure N991, Cancarb LTD., Alberta, Canada), 8 g of polyvinyl butyral resin (Butvar B-79, Monsanto Chemical Co., St. Louis, Mo.), 14 g of furfuryl alcohol-derived resin (a 50:50 mixture of 931 Graphite adhesive resin from Cotronics Corp., Brooklyn, N.Y., and Durez 16470 resin from Occidental Chemical Corp., North Tonawanda, N.Y.), 2 g of dispersant (Hypermer KD-2 from ICI Americas Inc., Wilmington, Del.), 40.32 g of toluene, and 26.77 g of 4-methyl-2-pentanone (a.k.a. methylisobutylketone). The mixture was shaken on a paint shaker for 10 minutes to mix the ingredients and then placed on a ball mill for 1 hour to fully homogenize the mixture.

Pre-impregnation of the fiber tows with the matrix precursor slurry was done on a drum winding apparatus shown schematically in FIG. 1. The fiber 2 was pulled from the supply reel 3 in a continuous fashion, over some alignment pulleys 4, between fiber guides 5, through a proportioner 7 held in place by a proportioner positioner 6, and onto a revolving take up drum 8. The drum 8 was first wrapped with a Teflon film to allow for easy removal of the fiber/matrix tape later in the process. The take-up drum 8 is translated along its axis at a controlled rate such that the spacing between successive wraps of fiber tow is controlled. The proportioner 7 is a vessel which contains the matrix slurry and has an orifice of controlled size at the fiber exit. In this case the proportioner 7 was a glass tube which had been necked down to form the orifice, which had a nominal inner diameter of 0.033 inches. While in the proportioner 7, the fiber tow 2 is wetted and impregnated by the matrix slurry. While exiting through the proportioner orifice the excess matrix slurry is scraped from the fiber tow, thus controlling the amount of slurry picked up by the tow. Impregnation of the fiber tow does not require the use of a proportioner and can be done by pulling the tow through a slurry bath. The fiber spacing on the take-up drum was adjusted to give a single layer of fiber tow with successive tow wraps touching each other. The fiber is wound onto the take-up drum while the slurry is still wet so that the slurry can fill in irregularities between the fiber tows and so that the surface tension of the slurry will tend to smooth over outer surface of the wrapped tows.

After winding the fiber tow onto the drum the slurry is allowed to dry for 1 hour. At that point the fibers are cut along the axis of the take-up drum and removed from the drum, producing a unidirectional (1-D) reinforced, pre-impregnated composite tape, typically between 0.005" and 0.020" thick. The tape was then cut into smaller sections and the pieces laid on top of each other to give the desired 2-D fiber architecture. In this example six tape layers, each 3"×2", were stacked in the sequence 0°–90°–0°–0°–90°–0°, where 0° designates that the fibers were aligned along the long dimension of the specimen and 90° designates that the fibers were aligned along the shorter dimension of the specimen.

The stacked tapes were then put in a stainless steel die lined with Teflon film. Lamination of the preform was done in a heated hydraulic press where the press platens were heated to 130° C. The die was placed in the press and a nominal load of 50 lbs. was placed on the die for roughly 5 minutes to allow the die to heat up to the same temperature as the press platens. The load on the die was then increased to nominally 600 lbs., exerting a pressure of 100 psi on the enclosed stacked prepreg tapes, and held for 10 minutes. During this procedure the binder and high char yield resins in the prepreg tapes softens and the stacked tapes are consolidated into a single composite preform. The load was then reduced to zero and the composite preform was removed from the die.

At this point the furfuryl alcohol resins were partially cured, imparting some degree of dimensionally stability to the composite preform. In order to impart sufficient hardness to the preform to allow for machining in the green state, and to enhance the char yield of the furfuryl resins, the preform was placed in an oven at 110° C. for 16 hours to cure the furfuryl resins.

Burn-out of the binders and silicon melt infiltration was performed in one continuous operation, but these processes can be done separately. The composite preform was placed on a carbon cloth wick which was supported on a boron-nitride coated graphite plate. Sufficient silicon (as a 95% Si-5% B alloy) was placed on the wick to completely saturate the wick and fill the preform when molten. This assembly was placed in a vacuum furnace containing a carbon electrical resistance heating element and carbon insulation, and the furnace evacuated to between 2 Torr and 20 m Torr using a mechanical vacuum pump. The initial heating rate of the furnace was 0.752 per minute up to 450° C. The slow heating rate is used to limit the rates of burn-out of the polyvinyl butyral binder and pyrolysis of the furfuryl resin. Heating too fast causes excess gas evolution from the decomposition of the resins which can lead to bloating or other damage to the integrity of the preform. This is the fastest heating rate allowable for composite preforms which do not contain the high-char yield resins; however, heating rates up to 3° C. per minute have been used with preforms containing a high-char yield resin with no deleterious effects. The heating rate was then increased to 1° C. per minute from 450 to 550° C.

The furnace was then heated to 1380° C. at a rate of 4° C. per minute and held at 1380° C. for ten minutes to allow for the furnace temperature to equilibrate. Silicon infiltration is accomplished by further heating the furnace to above the melting point of the silicon (or silicon alloy) at which point the molten silicon is pulled along the carbon cloth wick and into the composite preform by capillary action. The temperature range of infiltration can be from 1400° C. to 1800° C., but is preferably between 1400° C. and 1450° C. The time required for infiltration is on the order to 10 to 30 minutes. In this particular example, the furnace was heated from 1380° C. to 1430° C. at a rate of 3° C. per minute, held at 1430° C. for 20 minutes, and then cooled to 1350° C. at a rate of 3° C. per minute.

After cooling the infiltrated composite body was removed from the attached carbon cloth wicks, which had been largely converted to silicon carbide and silicon during infiltration, by cutting and grinding with diamond abrasive wheels. All composites were essentially fully dense with less than 3% porosity, and contained nominally 24 volume % of Hi-Nicalon fiber.

The composite was then machined into nominally 3"×0.5" rectangular specimens which were loaded to failure at room temperature in an Instron tensile testing machine. Five successive composite panels were fabricated by the above technique, and three bars from each panel were tensile tested, giving 15 tensile tests in all. The average mechanical properties of these specimens are summarized as follows: matrix cracking stress=26.5±1.7 ksi, initial elastic modulus=43.0±1.6 Msi, matrix cracking strain=0.062±0.003%, ultimate strength=54.3±2.4 ksi, and strain at ultimate strength=0.69±0.05% (the ranges listed are the 95% confidence intervals for the average value of each parameter).

Example B

In this example a unidirectional (1-D) composite was made from Hi-Nicalon™ fiber coated with nominally 0.42 μm of boron nitride followed by 0.37 μm of silicon carbide, which was applied by atmospheric pressure CVD (done by 3M Metal Matrix Composite Program, 3M Industrial and Consumer Sector, St. Paul, Minn.). The fabrication technique was identical to that in Example A except that 14 g of Butvar B-76 was used as a binder in place of the 8 g of Butvar B-79. After forming the tapes by drum winding, the composite lay-up was unidirectional (1-D) by aligning the fibers of each layer in the same direction. Lamination and infiltration were the same as in Example A. The final composite had roughly 22 volume percent fiber. Tensile testing results showed a matrix cracking stress of 26 ksi, an initial elastic modulus of 42.4 Msi, a matrix cracking strain of 0.061%, an ultimate strength of 59.0 ksi and a strain at ultimate strength of 0.73%.

Example C

In this example a composite part having complex shape and tight radius of curvature was fabricated by the prepreg approach. The fiber used was Hi-Nicalon which had a nominal coating of 0.5 μm boron nitride–0.03 carbon–0.5 μm silicon nitride–0.05 μm carbon. The prepreg tapes were fabricated as discussed in Example A. The tape was then used to lay-up a "tri-tab" assembly which incorporates an ID radius of curvature of only 0.15" on the foot of the raised section. The four inner composite plies of the raised section were wrapped around a pre-shaped piece of carbon which had been coated with boron nitride. This was then laid on four base sheet plies, and the assembly covered with four cover plies of prepreg tape. The lay-up was such that each section of the composite consisted of 8 tape plies with the fiber in a 0°–90° crossply configuration.

The laid-up assembly was placed in a laminating fixture which consisted of a stainless steel plate with a rectangular cavity. A thin sheet of Teflon film was placed under and over the prepreg assembly to prevent it from sticking from the lamination die and latex rubber bladder. A sheet of latex rubber was then clamped over the cavity. The lamination die was then placed in an autoclave and attached to a vacuum line which allowed for evacuation of the cavity within the die. The autoclave was sealed and the cavity in the lamination die was evacuated, drawing the rubber bladder down over the prepreg assembly. The autoclave was heated to 130° C. over 15 minute period at which point it was pressurized to 90 psi with nitrogen gas. After a 30 minute hold at 130° C. the autoclave was cooled to below 50° C. and then the pressure was released. This lamination procedure as described is a variant of the technique known as "vacuum bagging and autoclaving" to those skilled in the art.

The laminated preform was removed from the lamination die and placed in a oven at 110° C. for 16 hours to further cure the furfuryl resins in the matrix. The carbon insert was then removed from the raised section of the preform and the edges of the preform were trimmed. The preform was then infiltrated with a Si-5%B alloy as described in Example A.

Example D

In this example a 0°–90° crossply composite was made from Hi-Nicalon™ fiber coated with nominally the same fiber coating as described in Example A. The fabrication technique was identical to that in Example A except that an impregnation slurry containing no particulate carbon was used. The impregnation slurry used was prepared by adding 300 g of zirconia grinding media, 50 grams of silicon carbide powder (Type HSC SiC Grade 059(s) from Superior Graphite Co., Chicago, Ill.), 14 grams of polyvinyl butyral resin (Butvar B-76, Monsanto Chemical Co., St. Louis, Mo.), 14 grams of furfuryl alcohol-derived resin (a 50:50 mixture of 931 Graphite adhesive resin from Cotronics Corp., Brooklyn, N.Y., and Durez 16470 resin from Occidental Chemical Corp., North Tonawanda, N.Y.), 2 g of dispersant (Hypermer KD-2 from ICI Americas Inc., Wilmington, Del.), 40.32 grams of toluene and 26.77 grams of 4-methyl-2-pentanone (a.k.a. methyl-isobutyl ketone) to a 250 milliliter polyethylene bottle. The drum winding to form pre-preg tapes, the composite lay-up, lamination and silicon infiltration steps were all the same as described in Example A. The finished composite had about 26 volume % reinforcing fibers at the completion of fabrication. Tensile testing results showed a matrix cracking stress of 23 ksi, an initial elastic modulus of 28.6 Msi, a matrix cracking strain of 0.08%, an ultimate strength of 53.4 ksi and a strain at ultimate strength of 0.79%.

What is claimed:

1. A method for preparing a complex shaped preform, comprising: providing a mass of fibers, each fiber having a diameter less than about 40 micrometers; impregnating the mass of fibers with a slurry composition containing at least one high char yield resin selected from a carbon forming resin or a ceramic forming resin, or a mixture of both; forming the impregnated mass of fibers into a preselected preform; and firing the preform at a temperature and time sufficient to cure the preform, wherein the carbon forming resin is selected from the group consisting of phenolics, furfuryl alcohol, partially-polymerized resins derived therefrom, petroleum pitch, coal tar pitch, and mixtures thereof.

2. A method for preparing a complex shaped preform according to claim 1 where said fibers are continuous.

3. A method for preparing a complex shaped preform according to claim 2 where said fibers are bundled in tows.

4. A method for preparing a complex shaped preform according to claim 1 where said fibers are silicon carbide-containing fibers.

5. A method for preparing a complex shaped preform according to claim 4 where said silicon carbide-containing fibers are selected from the group consisting of silicon carbide, Si-C-O, Si-C-O-N, Si-C-O-Metal, where Metal is titanium or zirconium.

6. A method for preparing a complex shaped preform according to claim 1 where each fiber has at least one coating covering substantially all of its outer surface, and wherein said coating is selected from the group consisting of a nitride, a boride, a carbide, an oxide, a silicide, pyrolyzed carbon, and mixtures thereof; said boride being selected from the group consisting of borides of hafnium, niobium, tantalum, titanium, vanadium, zirconium, and mixtures thereof.

7. A method for preparing a complex shaped preform according to claim 6 where each fiber has more than one coating.

8. A method for preparing a complex shaped preform according to claim 1 where said slurry composition contains particles selected from the group consisting of carbon, silicon carbide, and mixtures thereof having a mean particle size of about 0.1 to 20 micrometers.

9. A method for preparing a complex shaped preform according to claim 7 where said coatings are deposited as a coating system selected from the group consisting of a nitride coating and a silicon carbide coating; a boron nitride, a carbide, and a silicon nitride coating system; a boron nitride, a silicon carbide, a carbide, and a silicon nitride coating system; a boron nitride, a carbon, a silicon nitride and a carbon coating system; and a carbon, a boron nitride, a carbon, a silicon nitride, and a carbon coating system; and mixtures thereof.

10. A method for preparing a complex shaped preform according to claim 6 where the coating thickness is about 0.1 to about 4.0 micrometers.

11. A method for preparing a complex shaped preform according to claim 10 where said coating is selected from the group consisting of elemental carbon, a metal carbide, a metal coating which reacts with molten silicon to form a silicide, a metal nitride, a metal silicide, and mixtures thereof.

12. A method for preparing a complex shaped preform according to claim 1, where the ceramic forming resins comprise resins which pyrolyze to form a solid phase selected from the group consisting of silicon carbide, carbon, silicon nitride, silicon-oxycarbides, silicon-carbonitrides, boron carbide, boron nitride, zirconium carbide, zirconium nitride, titanium carbide, titanium nitride, and mixtures thereof.

13. A method for preparing a silicon-silicon carbide composite, comprising the steps of: providing a mass of silicon carbide-containing fibers bundled in tows, each fiber having a diameter less than about 40 micrometers; impregnating the mass of silicon carbide-containing fibers with a slurry composition containing at least one high char yield resin selected from the group consisting of a carbon forming resin, a ceramic forming resin, and mixtures thereof; forming the impregnated mass of fibers into a complex shape of a preselected preform; curing the complex shape to form a silicon carbide-containing fiber preform; providing a necessary amount of a carbonaceous material to the preform to react with molten silicon to form silicon carbide; and then infiltrating the preform with molten silicon, wherein the carbon forming resin is selected from the group consisting of phenolics, furfuryl alcohol, partially-polymerized resins derived therefrom, petroleum pitch, coal tar pitch, and mixtures thereof.

14. A method for preparing a silicon-silicon carbide composite according to claim 13 where each fiber has at least one coating covering substantially all of its outer surface and wherein said coating is selected from the group consisting of a nitride, a boride, a carbide, an oxide, a silicide, pyrolyzed carbon, and mixtures thereof; said boride being selected from the group consisting of borides of hafnium, niobium, tantalum, titanium, vanadium, zirconium, and mixtures thereof.

15. A method for preparing a silicon-silicon carbide composite according to claim 14 where the coating thickness is about 0.1 to about 4.0 micrometers.

16. A method for preparing a silicon-silicon carbide composite according to claim 14 where each fiber has more than one coating.

17. A method for preparing a silicon-silicon carbide composite according to claim 13 where said slurry composition contains carbon particles, silicon carbide particles, or mixtures of carbon and silicon carbide particles, having a mean particle size of about 0.1 to 20 micrometers.

18. A method for preparing a silicon-silicon carbide composite according to claim 13 where the ceramic forming resins comprise resins which pyrolyze to form a solid phase selected from the group consisting of silicon carbide, carbon, silicon nitride, silicon-oxycarbides, silicon-carbonitrides, boron carbide, boron nitride, metal carbides, metal nitrides, and mixtures thereof.

19. A method for preparing a silicon-silicon carbide composite according to claim 18 where the metal carbide or metal nitride is zirconium or titanium.

* * * * *